United States Patent [19]
Oliverio et al.

[11] 3,757,218
[45] Sept. 4, 1973

[54] ELECTRICAL TESTING INSTRUMENT STRUCTURE

[75] Inventors: Anthony Daniel Oliverio, Chesterland; Marvin Levi Ward, Brunswick, both of Ohio

[73] Assignee: Keithley Instruments, Inc., Solon, Ohio

[22] Filed: Dec. 13, 1971

[21] Appl. No.: 207,264

[52] U.S. Cl.................. 324/156, 324/72.5, 324/149
[51] Int. Cl............................. G01r 1/04, G01r 1/06
[58] Field of Search.................... 324/149, 156, 72.5; D26/1 Q

[56] References Cited
UNITED STATES PATENTS
2,397,975  4/1946  Obermaier........................... 324/156

*Primary Examiner*—Alfred E. Smith
*Attorney*—J. Herman Yount, Jr.

[57] ABSTRACT

An electrical instrument for measuring or testing electrical characteristics, such as resistance or voltage, of test circuits is provided with a probe having an electrical contact tip for engaging a portion of such a test circuit. The contact tip is electrically connected to the instrument's measuring circuitry by an elongated, flexible cable for communicating electrical signals therebetween. An instrument housing serves to contain the measuring circuitry and has surrounding walls which define an encircling trough with a continuous cable receiving opening facing outwardly of the housing. The trough is of sufficient width and depth to receive a substantial portion of the intermediate length of the cable so that the cable may be stored in the trough, as by wrapping or reeling the cable around the housing while being received in the trough. The housing is preferably formed as a three piece structure including a bottom member and an intermediatemember which cooperate together to define a battery storage compartment and an adjacent ground lead storage compartment, with the two compartments being surrounded by the cable receiving trough. The intermediate member has provisions for supporting a printed circuit board, or the like, containing the instrument's measuring circuitry in a compartment defined between the cover and the intermediate member.

16 Claims, 8 Drawing Figures

PATENTED SEP 4 1973 3,757,218

ELECTRICAL TESTING INSTRUMENT STRUCTURE

This invention relates to the art of electrical instruments for testing or measuring electrical characteristics, such as voltage and resistance, and more particularly to such an instrument having a housing containing the instrument's electrical circuitry and a probe, having a contact tip, which is electrically connected to the circuitry with an elongated, flexible cable.

The invention is particularly directed to improvements in the construction of such an instrument so that the probe and the cable may be easily stored and retrieved from the housing.

Typically, electrical instruments such as voltmeters, ohmmeters and the like employ an instrument housing which contains the measuring circuitry and a display meter is mounted on a housing sidewall for providing a visual indication as to the quantity of the electrical characteristic being measured. A test lead and a ground lead are each secured at one end to the instrument, with their opposite ends being connected across an unknown source. Typically, no test lead or ground lead storage is provided by the instrument housing. Consequently, the test and ground leads are stored separately or are merely wrapped in a cumbersome fashion about the exterior of the instrument housing. The exposed leads may be damaged.

An object of the present invention is to provide an electrical instrument having a housing constructed in such a manner that the electrical conductor leads being stored within the housing in an uncumbersome fashion so as to be protected from damage.

Another object of the present invention is to provide an improved electrical instrument housing having sidewalls configured so as to define an encircling trough in which a substantial portion of the intermediate length of a probe cable may be stored.

A still further object of the present invention is to provide an improved electrical instrument housing having means for releasably storing a test probe substantially entirely within the housing while simultaneously storing substantially the entire length of the probe cable within the housing.

A stil further object of the present invention is to provide an electrical instrument housing constructed in three basic parts, namely a cover, an intermediate member and a bottom member, with the latter two members being configured to define therebetween a battery compartment and an adjacent ground lead storage compartment, together with a probe cable storage trough encircling the battery compartment and the ground lead storage compartment.

In accordance with one aspect of the present invention, it is contemplated that the electrical measuring instrument serve to measure or test electrical characteristics of a test circuit or the like, with a probe having an electrical contact tip for engaging a portion of a test circuit and electrically connected to the instrument's measuring circuitry by an elongated, flexible cable for communicating electrical signals therebetween. The instrument housing includes walls which define an encircling trough having a continuous cable receiving opening facing outwardly of the housing. The trough is of sufficient width and extends into the housing a sufficient depth to receive the probe cable in such a manner that substantially all of the intermediate length of the cable may be stored in the trough, as by reeling the cable around the housing so as to be received in the trough.

In accordance with a further aspect of the present invention, the instrument housing includes a bottom member, an intermediate member secured to the bottom member and a cover member secured to the intermediate member. The intermediate member is spaced from the bottom member by spacing means so that the spacing is greater than the width of the probe cable. The spacing means is located inwardly from the peripheral edges of the bottom and intermediate members so as to define therebetween an endless cable receiving trough having a continuous outwardly facing opening for receiving the cable so that substantially the entire length of the cable may be stored within the housing.

In accordance with a still further aspect of the present invention, the instrument housing includes a plurality of interconnected sidewalls which together with a top member defines the cover with the sidewalls being located so as to circumscribe and be spaced from the bottom member.

The foregoing and other objects and advantages of the invention will become more readily apparent from the following description of the preferred embodiment of the invention taken in conjunction with the accompanying drawings which are a part hereof and wherein.

Figure 1:
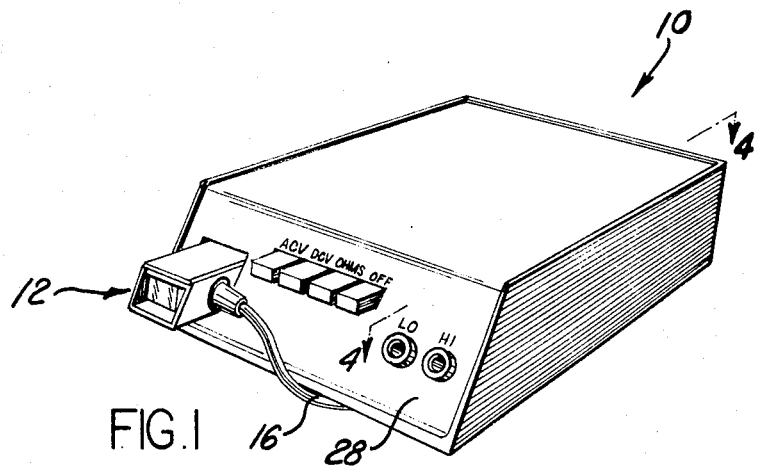
FIG. 1 is a perspective illustration of the preferred embodiment of the instrument showing the probe and the probe cable stored within the instrument housing.
Figure 2:
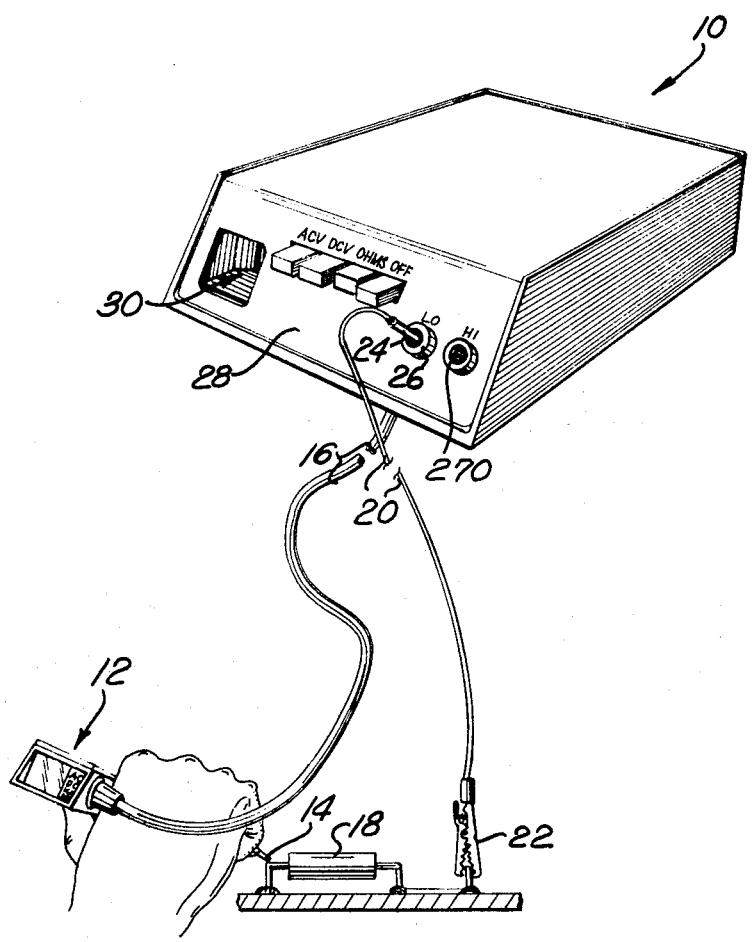
FIG. 2 is a perspective view similar to that of FIG. 1 showing the probe and probe cable removed from the housing with the probe and a ground lead being used for testing purposes.
Figure 3:
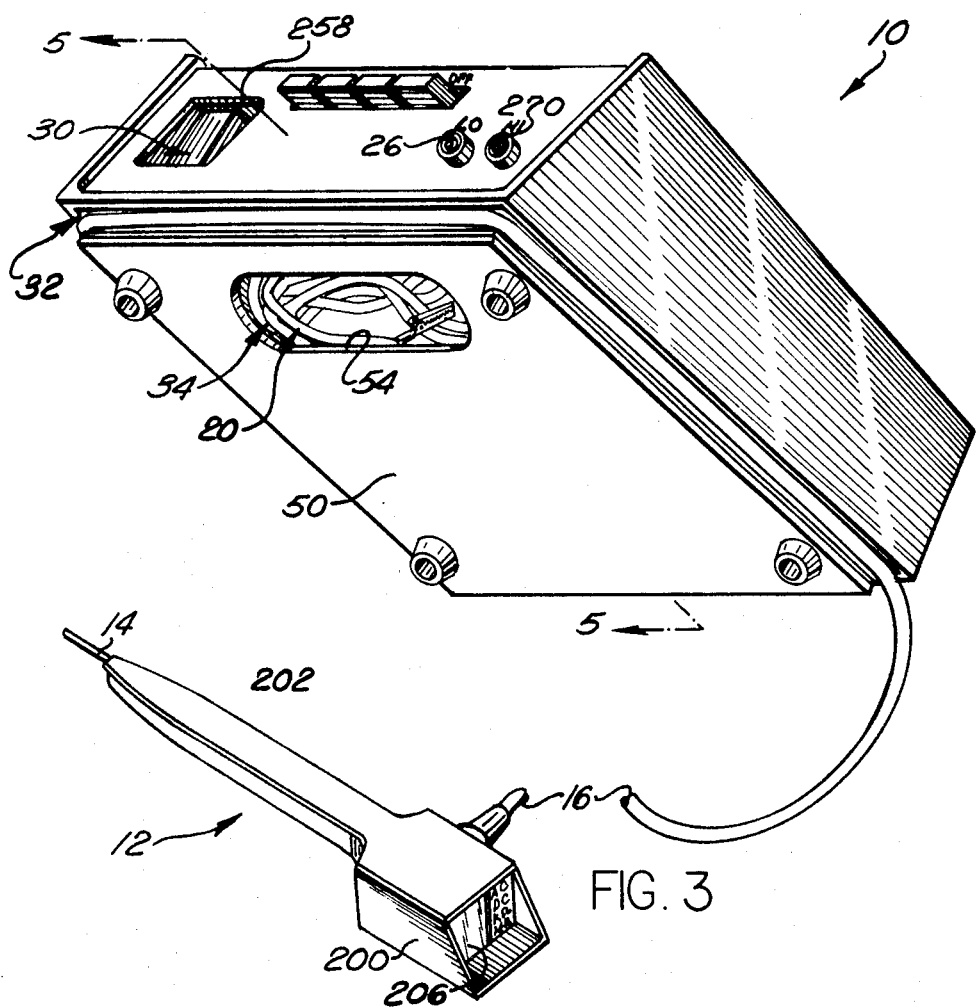
FIG. 3 is a perspective view illustrating the bottom of the instrument housing with the probe being removed.

Referring now to the drawings wherein the showings are for purposes of illustrating a preferred embodiment of the invention only and not for purposes of limiting same, there is illustrated an electrical testing instrument for measuring resistance, voltage or current flow in a circuit. The instrument includes an instrument housing 10 and a probe 12. As best shown in FIG. 3, probe 12 is configured so as to be readily held by a human hand while being displaced so that its electrical contact tip 14 is positioned to make electrical engagement with a portion of a circuit 18 to be tested. As will be developed in greater detail hereinafter, probe 12 is connected to electrical measuring circuitry contained in housing 10 by means of a conductor carrying flexible cable 16. Provisions are made for storing cable 12 and probe 12 within the housing, in the manner shown in FIG. 1. When the instrument is in use, probe 12 is removed from the housing and a substantial length of cable 16 is paid out from the housing so that, as shown in FIG. 2, the probe may be positioned by a human hand so that contact tip 14 engages a portion of test circuit 18. In this application the other terminal end of test circuit 18 may be considered as the ground side of the circuit, and a ground wire 20 is electrically connected thereto by means of a conventional spring clip 22 with the other end of ground wire 20 being provided with a male prong 24 which is inserted into a female contact terminal 26 located on the front face 28 of housing 10. Housing 10 is provided with a probe storage compartment 30 for slidably receiving and storing a substantial length of probe 12, an encircling cable storage trough 32 for storing cable 16, and a ground lead storage compartment 34 for storing ground lead 20. The construction of housing 10 so as to obtain compartments 30, 34 and trough 32, as well as other features, will now be described in greater detail with specific reference to FIGS. 4 through 8.

Housing 10 is preferably formed as a three piece structure including a bottom member 40, an intermediate member 42 and a cover 44. Preferably, these parts are constructed of plastic material so that they may be molded in the form as shown and described herein.

The bottom member 40 includes a substantially flat, rectangular plate 50 having four instrument support pads 52 extending downwardly from the bottom surface thereof. An elongated opening 54, as best seen in FIG. 3, is provided in the bottom member to provide access to the ground lead storage compartment 34. Opening 54 of sufficient width to permit partial entry into the compartment of human fingers so that a carrying handle is provided for the instrument. Extending upwardly from the upper surface of plate 50 there is provided two longitudinally extending ribs 55 and 56 which serve as battery spacers for three rows of batteries contained in the housing.

Figure 5:
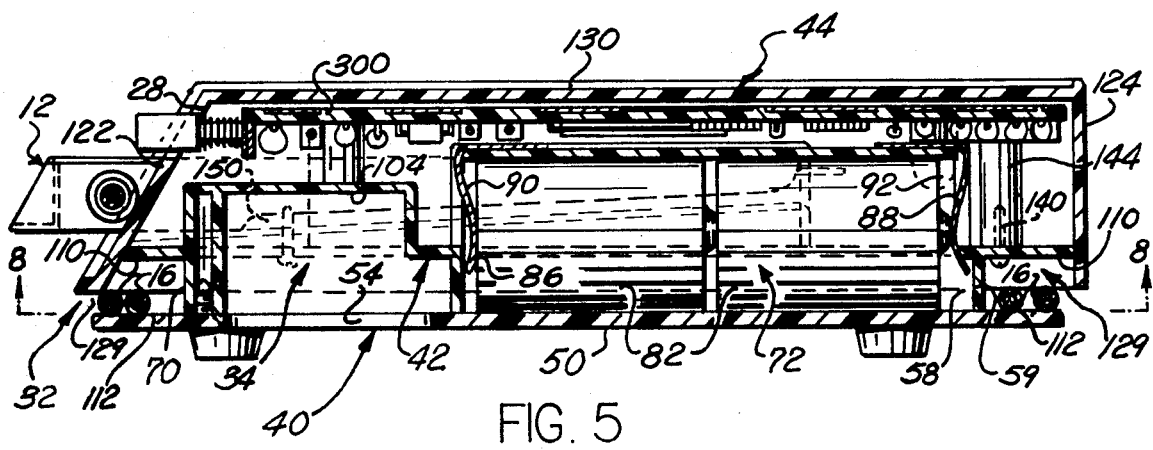
FIG. 5 is a sectional view taken generally along line 5—5 looking in the direction of the arrows in FIG. 4.
Figure 6:
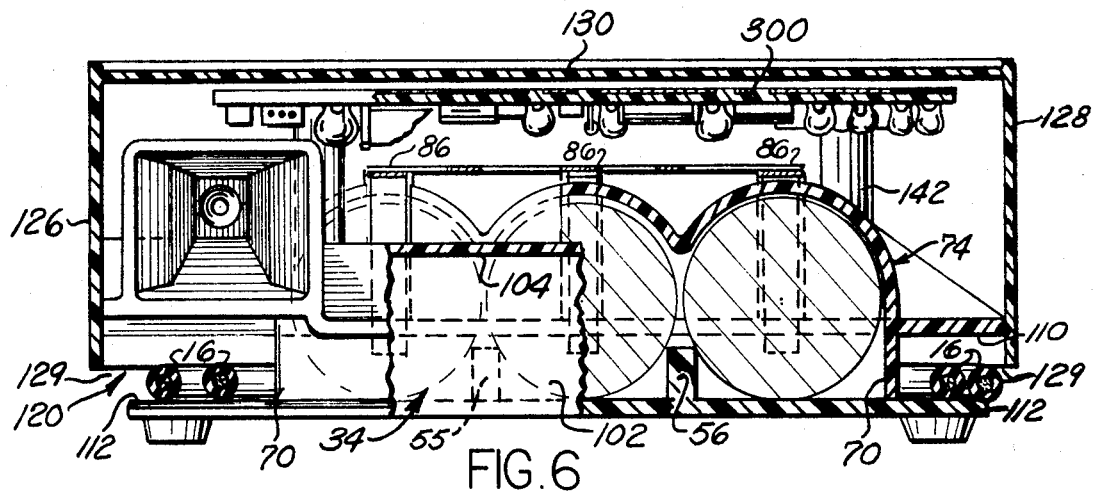
FIG. 6 is a sectional view taken along line 6—6 looking in the direction of the arrows in FIG. 4 but with the probe being removed.
Figure 7:
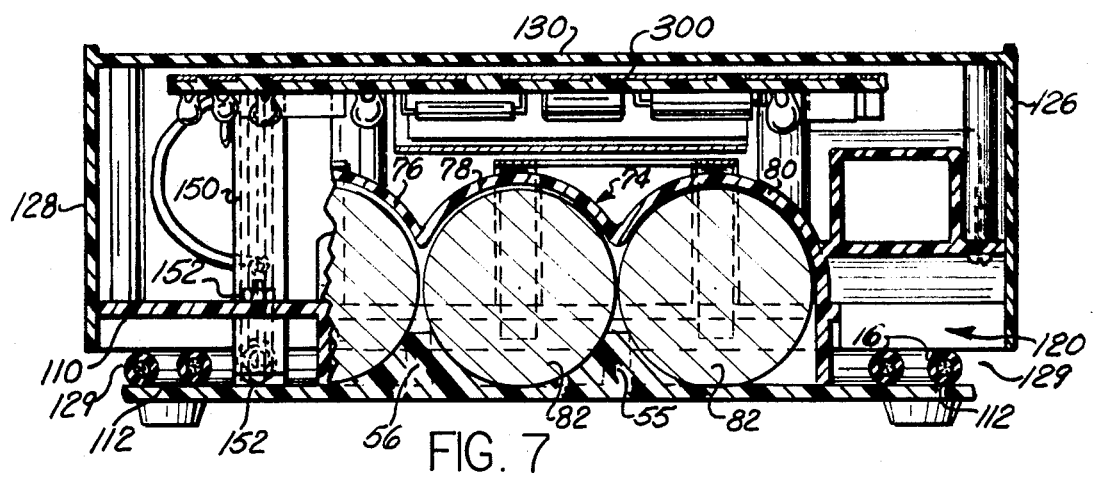
FIG. 7 is a sectional view taken along line 7—7 looking in the direction of the arrows of FIG. 4 but with the probe being removed from the housing; and, FIG. 8 is a sectional view taken along line 8—8 looking in the direction of the arrows in FIG. 5.
Figure 8:
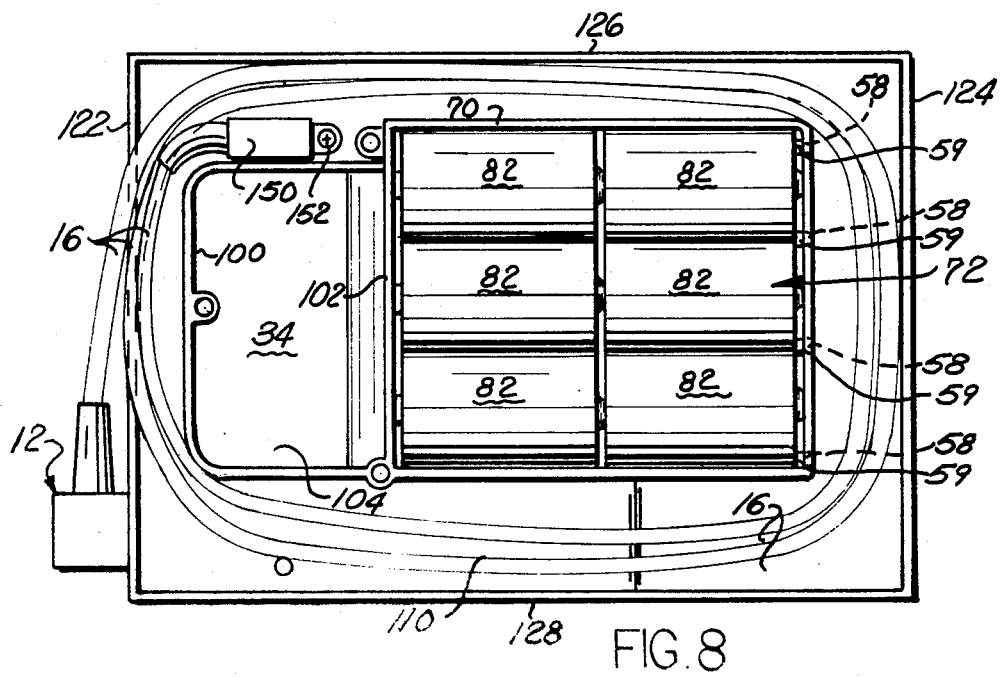

The intermediate member 42 has a rectangular outline corresponding essentially with that of the bottom member 40. Spacer walls 70 extend downwardly from member 42 and make engagement with the upper surface of plate 50. Walls 70, as best shown in FIG. 8, provide a rectangular enclosure to partially define a rectangular shape battery compartment 72. On the opposite side of intermediate member 42 a roof 74 is provided for the battery compartment. Roof 74 is configured with three interconnected arcuate wall sections 76, 78 and 80 which extend longitudinally of the housing. These wall sections are arcuate so as to correspond in curvature with that of the batteries contained in compartment 72. Six batteries 82 may be housed in compartment 72 in three rows, with each row including two batteries. The rows are divided by the arcuate sections of roof 74 in the intermediate member 42 and the battery spacing ribs 55 and 56 extending upwardly from plate 50 of the lower member 40 so that the batteries are held in place between the upper surface of plate 50 and roof 74 in the manner as best shown in FIGS. 6, 7 and 8. The size of battery compartment 72, the curvature of roof sections 76, 78 and 80 is dependent on the type of battery employed. For example, each battery 82 may take the form of a 1.5 volt, size D battery of either the conventional dry cell type or, if desired, a rechargeable alkaline battery. The batteries are all aligned so that their positive terminals are placed to the right, as viewed in FIG. 8, with each row of batteries being electrically connected between a negative spring contact clip 86 and a positive spring contact clip 88. The spring contact clips are electrically connected so that the six batteries are connected in series to define a 9 volt power suppy source. This series connected voltage supply source is connected to provide operating power for the electrical circuitry contained within the housing. The negative and positive spring clips 86 and 88, as best shown in FIG. 5, are each substantially L-shaped having one leg mechanically secured to the upper surface of battery compartment roof 74 and a second leg extending initially beyond compartment defining wall 70 and then inwardly through respective slots 90 and 92 defined at opposite ends of roof 74 to extend within the battery compartment 72 and engage opposite ends of a pair of series connected batteries 82.

The ground lead storage compartment 34 is defined by walls 100 extending downwardly from the intermediate member 42 together with a portion 102 of the battery storage compartment defining walls 70. Walls 100, 102 and 70 all extend downwardly from member 42 so that their lowermost edges lie in a common plane when in abutting engagement with the upper surface of plate 50. The ground lead compartment roof 104 is defined in the intermediate member 40 by walls which extend upwardly of member 42. The storage compartment 34 is located in registry with opening 54 defined in plate 50 of the lower member 40 so as to provide access to the storage compartment. The compartment 34 is of sufficient size to permit storage of a conventional ground lead 20 while still permitting sufficient room for entry of human fingers to provide a carrying handle for the instrument.

Walls 70, 100 and 102 which extend downwardly from the intermediate member are located inwardly of the rectangular periphery of the intermediate member by a distance which is at least twice the diameter of cable 16. Extending peripherally outward from these walls is a peripheral flange 110 of member 42 and which is spaced by walls 70, 100 and 102 from the upper surface of plate 50 by a distance greater than the diameter of cable 16. The outwardly facing surfaces of walls 70, 100 and 102, the downwardly facing surface of the peripheral flange 110 and the upper facing peripheral surface portion 112 of plate 50 define an encircling trough 120 in the instrument housing. The trough is partially closed by front, rear, left and right overlapping sidewalls 122, 124, 126 and 128, respectively. These sidewalls are interconnected and extend downwardly from a flat, cover plate 130. sidewalls 126 and 128 and rear wall 124 extend vertically downward from cover plate 130. Front sidewall 122 extends downwardly at an angle, as best shown in FIG. 5, the lower of o the interconnected walls 122, 124, 126 and 128 is a rectangular outline circumscribing the rectangular outline of bottom member 40 and intermediate member 42. The lower peripheral edge of walls of 122, 124, 126 and 128 is spaced vertically upward and outward from the upper surface of bottom plate 50, as best shown in FIG. 5, so as to provide an opening 129 which extends continuously around or circumscribes the bottom of the housing 10. This opening is defined by the straight outer edge portions of the plate 50 and the lower edge portions of the sidewalls 122, 124, 126 and 128. Cover 44 is secured to the intermediate member so as to be spaced upwardly from plate 50 by means of screws 140 threaded through intermediate plate 42 and into corresponding mounting studs 142 extending downwardly from plate 130 of cover 44.

Upturned L-shaped flanges 58 are cut away from bottom plate 50 and serve as alignment flanges when assembling the intermediate member 42 with the bottom member 40. Corresponding apertures 59 are provided in a portion 61 of wall 70 for receiving these flanges to obtain correct alignment during assembly of members 40 and 42.

The conductor carrying cable 16 has one end electrically connected to the circuitry contained within the instrument housing by means of a terminal block 150 secured as with a nut and bolt assembly 152 to the intermediate member 42. With probe 12 stored in the probe storage compartment 30, cable 16 is preferably stored in trough 120 in the manner as shown in FIG. 8, in that the cable extends into the trough from connector block 150 and then is wrapped or reeled around the outwardly facing surfaces of walls 100 and 70 with increasingly outwardly extending cable layers dependent on the length of the cable. Consequently, when the probe is removed from the storage compartment 30, cable 16 may be paid out without becoming entangled with itself as it is unwrapped or unreeled from the trough.

Probe 12, as best shown in FIG. 3, includes an enlarged head portion 200 and a slender handle portion 202 from which the contact tip 14 protrudes. Contact tip 14 is electrically connected to a conductor 204 which extends through the handle portion 202 of probe 12 and then exits from the enlarged portion 200 thereof and is carried by the conductor carrying cable to the terminal block 150. Other conductors are provided for energizing a display 206 carried at one end of probe 12 and these conductors are also carried by cable 16 to terminal block 150 where they are then interconnected with the electrical circuitry contained in the housing.

Figure 4:
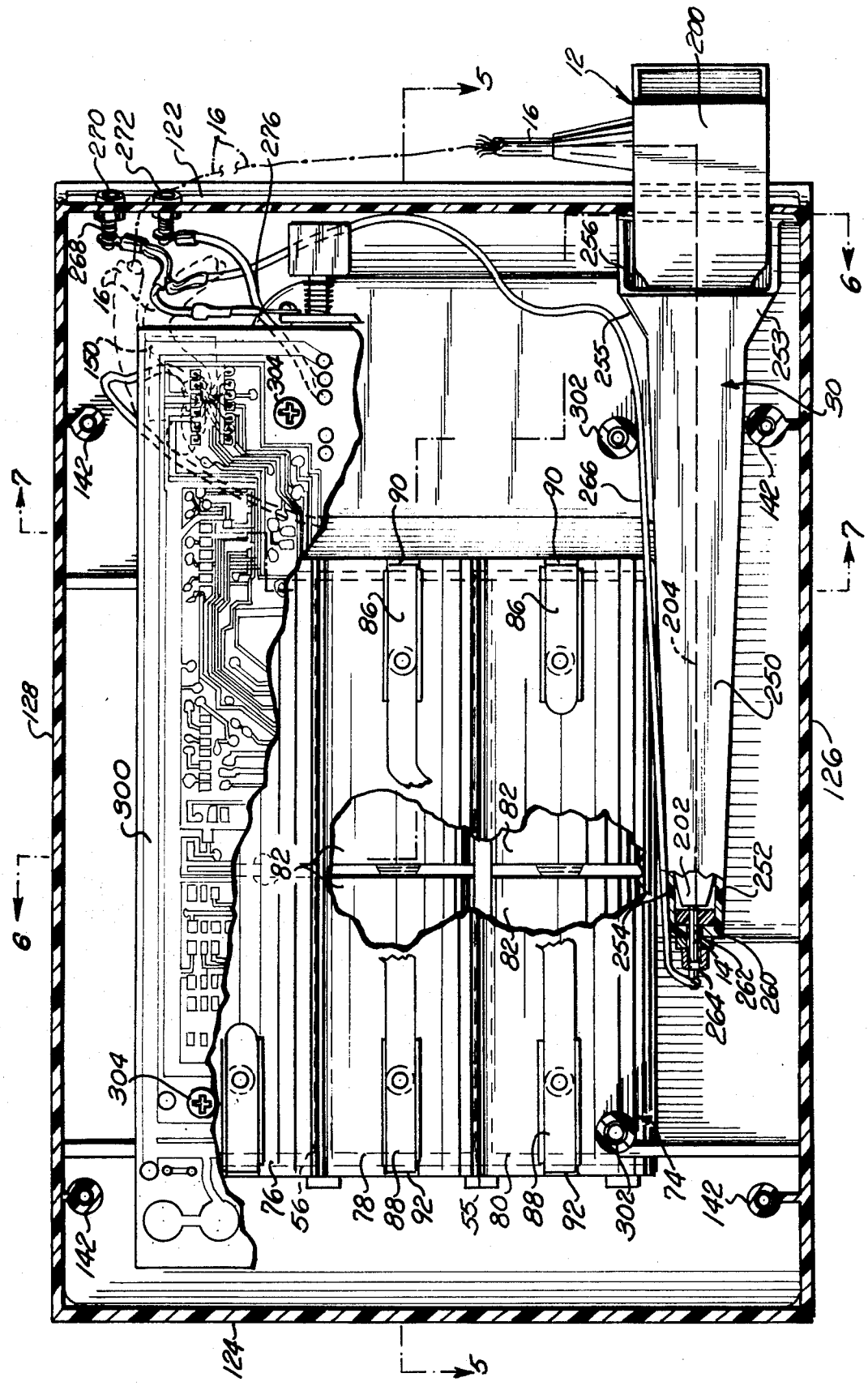
FIG. 4 is a sectional view taken generally along line 4—4 looking in the direction of the arrows in FIG. 1 with parts of the structure being broken away.

The probe storage compartment 30 is provided by a hollow elongated housing 250 carried on the upper surface of intermediate member 42. As best shown in FIG. 4, housing 250 is located so that it extends between sidewall 126 and the battery compartment roof 74. Although housing 250 could be constructed separately from and then attached to the intermediate member 42, it is preferably molded as an integral part thereof. Housing 250 includes upstanding opposed sidewalls 252 and 254 which converge toward each other in the direction inwardly of the instrument housing, with the tapered configuration corresponding essentially with that of the handle portion 202 of probe 12. The housing is of sufficient length to receive the handle portion 202 as well as a portion of probe head 200. Rear walls 253 and 255 flare outwardly (see FIG. 4) and terminate in a rectangular shaped probe receiving opening 256. The front sidewall 122 of cover 44 is also provided with a rectangular shaped opening 258 in registry with opening 256 so that the probe may be inserted through the front sidewall and into compartment 30. Tapered walls 252 and 254 terminate in an end wall 260 having a centered aperture 262 therein for receiving contact tip 14 when the probe is inserted into the compartment 30. Aperture 262 serves to align the probe when positioned in compartment 30 as well as to direct the probe tip 14 into electrical engagement with electrical contact 264 secured to the exterior side of wall 260.

Electrical contact 264 is electrically connected by means of a conductor 266 to an electrical terminal post 268 secured to front sidewall 122 of the cover 44. Conductor post 268 is electrically connected to terminal jack 270 which protrudes on the exterior side of front sidewall 122 and serves as the "HI" input for the instrument. This terminal jack may be used with an auxiliary conductor lead similar to ground lead 20, and when such a lead has its plug end inserted into the conductor jack 270 an electrical circuit is completed through conductor 266, contact 264 to the probe contact tip 14. This path continues through the probe by means of conductor 204 and then through cable 16 to the electrical circuitry mounted within the instrument housing. In use, the instrument is thus converted to a bench display instrument with meter readings being taken from display 206 on the exposed end of probe 12. For a more detailed description of this feature reference is made to copending application Ser. No. 207,262 filed Dec. 13, 1971, assigned to the same assignee as the present invention. Immediately adjacent conductor jack 270 there is provided another conductor jack 272 for receiving the plug end of ground lead 20. Conductor jack 272 is connected to a "LO" terminal post 274 located on the interior side of front sidewall 122. A conductor 276 connects terminal post 274 to the circuitry mounted within the instrument housing.

The space within instrument housing between battery compartment roof 74 and the lower surface of the cover plate 130 serves as a compartment for housing the instrument's electrical circuitry. The circuitry is mounted on a printed circuit board 300 so that the bulk of the electrical components are supported on the underside of the printed circuit board. Although suitable means may be provided for mounting the printed circuit board 300 within the housing, there is preferably provided for spaced apart posts 302 extending upwardly from intermediate member 42 and to which circuit board 300 is secured, as by screws 304.

From the foregoing it is seen that an instrument housing 10 has been provided and which is constructed of three basic elements; to wit, a bottom member 40, an intermediate member 42 and a cover 44. The intermediate member is spaced from the bottom member 40 by walls 70 and 100 by a distance greater than the diameter of the conductor carrying cable 16. Walls 70 and 100 are located inwardly from the rectangular periphery of the bottom member 40 and the intermediate member 42 so as to define a cable storage trough 120. Cable 16 is electrically connected to the circuitry mounted on printed circuit board 300 by means of conductors connected to a terminal block 150 which extends from the printed circuit board through the intermediate member and is secured thereto as with a nut and bolt assembly 152. Cable 16 may then be stored in trough 120 by wrapping or reeling the cable around the outwardly facing surfaces of walls 70 and 100 in increasing layers, as shown in FIG. 8, and the probe is then stored in the probe storage compartment 30.

When the cable 16 is in the trough 120 it is disposed inwardly of the sidewalls 122, 124, 126 and 128. Therefore, the stored cable 16 is fully protected by the housing 10. With the probe being fully inserted into the storage compartment 30 its enlarged head portion 200 protrudes from the housing and the elongated handle portion 202 is entirely received within probe housing 250 formed on the upper surface of the intermediate member 42. When the probe is so stored its contact tip 14 extends through an aperture 262 formed in an end wall 260 of housing 250 so that the contact tip makes electrical engagement with electrical contact 264 which, in turn, is electrically connected by means of conductor 266 to the HI terminal post 268. With the probe so stored the HI terminal may be employed for measuring purposes in conjunction with an auxiliary test lead plugged into the HI conductor jack 270. Consequently, an electrical path is completed from the test lead through jack 270, conductor 266, contact 264, probe 14 and conductor 204 to the input of the electrical circuitry mounted on the printed circuit board 300. Similarly, the ground lead 20 is electrically connected through the LO input terminal jack 272 and by conductor 287 to a second input of the electrical circuitry carried by printed circuit board 300. When the probe 12 is disposed in the compartment 30, the display 206 functions as a readout or indicator for electrical characteristics of test circuitry engaged by the auxiliary test lead connected to the jack 270 and the ground lead 20.

The bottom member 40 and the intermediate member 42 cooperate to define a ground lead storage compartment 34 and an adjacent battery compartment 72 within the confines of walls 70 and 100. Preferably, the battery compartment is configured as shown in the drawings herein so that six batteries may be stored and connected in series to provide power for the circuitry mounted on a printed circuit board. The bottom member 40 has an opening 54 therein which is in registry with the ground wire compartment 34 and is of sufficient size so that at least portions of human fingers may be inserted therein for purposes of carrying the instrument.

In operation, when the probe 12 is removed from compartment 30, the probe cord 16 may be easily paid out or unreeled from trough 120 in an uncumbersome manner by merely pulling the cord in an outward direction through the opening 129 with an encircling motion around the sidewalls of the housing.

This relatively easy access to the trough 120 is provided by the continuous opening 129 which extends around the housing 10. It should be noted that when the cable 16 is in the trough 120 formed by the bottom plate 50, sidewalls 70 of the battery compartment, flange 110 and lower portions of the sidewalls 122, 124, 126 and 128, the cable is protected against engagement with external objects. Therefore, the walls of the trough 120 enclose and protect the cable 16 when it is disposed in the trough. When the probe is in use, as shown in FIG. 2, an electrical circuit is completed from the contact tip 14 through conductor 204 through the connector block 150 to the circuitry mounted on the printed circuit board 300. However it is contemplated that when certain types of circuitry are being tested it will be advantageous to utilize an auxiliary conductor rather than the probe 16. When this is the case, the probe 16 remains in the compartment 30 and the cable is stored in the trough 120 where it is protected against damage during use of the instrument.

The housing 10 has been described herein as being preferably constructed of three parts; namely, the bottom member 40, the intermediate member 42 and the cover 44. The parts are preferably molded from a plastic material so as to define various interconnecting and cooperating walls to obtain the various compartments described herein. It is apparent, however, that a varying number of parts could be employed. Thus, for example, the intermediate member 42 may be constructed of a flat sheetlike plate and structure may be attached thereto to define the battery compartment 72 and the ground wire compartment 34. Also, instead of having walls 70 and 100 being integral with and extending downwardly from the intermediate member, separate parts could be employed. These and other modifications are considered within the spirit and scope of the invention as more particularly defined in the appended claims.

What is claimed is:

1. An instrument for use in determining electrical characteristics of test circuitry, said instrument comprising a housing having top and bottom walls interconnected by a plurality of sidewalls, circuit means disposed within said housing for providing output signals which vary as function variations in the electrical characteristics of the test circuitry, a probe movable between a storage position adjacent to said housing and a test position in which said probe is spaced from said housing and is engageable with the test circuitry, cable means for conducting input signals from said probe to said circuit means, and recess means within said housing adjacent to said bottom wall for receiving a plurality of turns of said cable means to retain said cable means in a coiled condition within said housing when said probe is in the storage position, said recess means including a continuous opening extending around said housing adjacent to said bottom wall and exposed to the exterior of said housing to enable said cable means to be coiled around said housing within said recess means.

2. An instrument as set forth in claim 1 wherein said recess means includes an inner wall, said cable means includes an outer end portion connected to said probe and an inner end portion connected to said housing at an innermost portion of said recess means.

3. An electrical measuring instrument for measuring electrical characteristics of a test circuit with a probe having an electrical contact tip for engaging a portion of the test circuit and electrically connected to said measuring instrument by an elongated, flexible cable for communicating electrical signals therebetween and including a housing for said instrument having walls defining an encircling trough with a continuous cable receiving opening facing outwardly of and exposed to the exterior of said housing, said trough being of sufficient width and depth to receive a said cable through said opening in such a manner that substantially all of the intermediate length of said cable may be stored and retrieved from said trough by reeling and unreeling said cable into and from said trough.

4. An electrical measuring instrument as set forth in claim 3 wherein said housing includes wall means defining a compartment located above said trough for containing electrical circuit means; means for connecting the end of said cable opposite from said probe to said circuit means in such a manner that said cable extends into said trough at an inner location so that said cable may be stored in said trough by reeling said cable upon itself in an increasing encircling relationship starting from and extending outwardly of said inner location.

5. An electrical measuring instrument for testing electrical characteristics of a test circuit, said electrical measuring instrument comprising a probe having a contact tip for electrically engaging a portion of the test circuit, an elongated flexible cable for communicating electrical signals between an instrument measuring circuit and said contact tip, a housing for said instrument measuring circuit including a bottom member, an intermediate member secured to said bottom member and a cover member secured to said intermediate member, spacing means interposed between said bottom member and said intermediate member for defining a spacing therebetween greater than the width of said cable, said spacing means being located inwardly from the peripheral edge of said bottom and intermediate members so as to define therebetween an endless cable receiving trough having a continuous outwardly facing opening exposed to the exterior of said housing for receiving said cable through said opening in such a manner that substantially all of the intermediate length of said cable may be stored in said trough by wrapping said cable about said housing so as to be received within said trough.

6. An instrument as set forth in claim 5 wherein said intermediate member and said cover are configured to define a measuring circuit compartment therebetween, means for supporting said instrument measuring circuit in said circuit compartment, cable connecting means for connecting said cable with said circuit means, said connecting means being located adjacent said spacing means at a location peripherally inward from said peripheral edges so that said cable may be stored in said trough with said cable being reeled about and received in said trough in increasing layers extending outwardly toward said peripheral edges.

7. An instrument as set forth in claim 5 wherein said bottom member and intermediate member are configured to define a battery compartment therebetween.

8. An instrument as set forth in claim 5 wherein said housing has a sidewall having an aperture defined therein of sufficient size that said probe may be inserted therethrough into said housing, said intermediate member having means defining an elongated cavity and positioned relative to said wall aperture for receiving and supporting said probe when inserted into said housing through said aperture.

9. An electrical measuring instrument for testing electrical characteristics of a test circuit, said electrical measuring instrument comprising a probe having a contact tip for electrically engaging a portion of the test circuit, an elongated flexible cable for communicating electrical signals between an instrument measuring circuit and said contact tip, a housing for said instrument measuring circuit including a bottom member, an intermediate member secured to said bottom member and a cover member secured to said intermediate member, spacing means interposed between said bottom member and said intermediate member for defining a spacing therebetween greater than the width of said cable, said spacing means being located inwardly from the peripheral edges of said bottom and intermediate members so as to define therebetween an endless cable receiving trough having a continuous outwardly facing opening for receiving said cable in such a manner that substantially all of the intermediate length of said cable may be stored in said trough by wrapping said cable about said housing so as to be received within said trough, terminal means for releasably receiving one end of a conductor lead for use in electrically engaging another portion of a circuit to be tested, said intermediate member having wall means defining a conductor lead storage compartment facing said bottom member, said bottom member having an opening formed therein in registry with said storage compartment so that a said conductor lead may be placed in said compartment for storage.

10. An instrument housing as set forth in claim 9 wherein said opening and said storage compartment are configured of sufficient size whereby said opening and compartment cooperate to define a carrying handle for said housing.

11. A portable electrical measuring instrument for measuring electrical characteristics of a test circuit and comprising: housing means for said instrument having a bottom member and a plurality of interconnected sidewalls circumscribing and spaced from said bottom member, means for supporting a plurality of batteries disposed in said housing so as to be supported in abutting engagement with said bottom member, means defining a cable receiving trough between said sidewalls and said bottom member so that said trough extends inwardly of said sidewalls and has an opening exposed to the exterior of said housing, electric circuit means disposed in said housing and spaced from said bottom member, means for electrically connecting said circuit means to said batteries, a probe having an electrical contact tip, an elongated flexible cable having conductor means extending between said contact tip and said electric circuit means for conducting electrical signals therebetween, said cable being movable from a storage location disposed in said trough to an extended position at which said probe is spaced from said housing with a substantial portion of the length of said cable extending therebetween.

12. A portable electrical measuring instrument as set forth in claim 11 wherein said housing means further includes support means for supporting said electrical circuit means in spaced apart and substantially parallel relationship with said bottom member.

13. A portable electrical measuring instrument as set forth in claim 12 wherein said housing means further includes an intermediate member spaced from said bottom member and adapted to be in abutting engagement with said batteries for cooperating with said bottom member to define a battery compartment to retain said batteries in place.

14. A portable electrical measuring instrument as set forth in claim 11 wherein said housing means includes a top member connected to said interconnected sidewalls so as to define a cover, means for receiving said probe at a location intermediate said top and bottom member, one of said interconnected sidewalls having means defining an opening communicating with said probe receiving means.

15. A portable electrical measuring instrument for measuring electrical characteristics of a test circuit and comprising: housing means for said instrument having a bottom member and a plurality of interconnected sidewalls circumscribing and spaced from said bottom member, means for supporting a plurality in said batteries disposed insaid housing so as to be supported in abutting engagement with said bottom member, means defining a cable receiving trough between said sidewalls and said bottom member so that said trough extends inwardly of said sidewalls, electric circuit means disposed in said housing and spaced from said bottom member, means for electrically connecting said circuit means to said batteries, a probe having an electrical contact tip, an elongated flexible cable having conductor means extending between said contact tip and said electric circuit means for conducting electrical signals therebetween, said cable being movable from a storage location disposed in said trough to an extended position at which said probe is spaced from said housing with a substantial portion of the length of said cable extending therebetween, said housing means includes a top member connected to said interconnected sidewalls so as to define a cover, means for receiving said probe at a location intermediate said top and bottom member, one of said interconnected sidewalls having means defining an opening communicating with said probe receiving means, said probe carries display means thereon for displaying representations of said electrical characteristics; bench display terminal means for connecting an auxiliary test lead with said probe contact tip when said probe is stored in said probe receiving means so that said display means is exposed whereby said instrument may be converted from a remote probe display instrument to a probe stored bench display instrument.

16. A portable electrical measuring instrument for measuring electrical characteristics of a test circuit and comprising: housing means for said instrument having a bottom member and a plurality of interconnected sidewalls circumscribing and spaced from said bottom member, means for supporting a plurality of batteries disposed in said housing so as to be supported in abutting engagement with said bottom member, means defining a cable receiving trough between said sidewalls and said bottom member so that said trough extends inwardly of said sidewalls, electric circuit means disposed in said housing and spaced from said bottom member, means for electrically connecting said circuit means to said batteries, a probe having an electrical contact tip, an elongated flexible cable having conductor means extending between said contact tip and said electric circuit means for conducting electrical signals therebetween, said cable being movable from a storage location disposed in said trough to an extended position at which said probe is spaced from said housing with a substantial portion of the length of said cable extending therebetween, terminal means electrically connected to said electrical circuit means and disposed on one of said sidewalls for releasably engaging one end of an elongated test conductor having an opposite end for use in engaging a portion of a test circuit so that both said cable conductor means and said conductor communicate electrical signals between a said test circuit and said electrical circuit means, said housing means including means defining a test conductor storage compartment for storing said test conductors when not in use, said bottom member having an opening defined therein communicating with said storage compartment.

* * * * *